Jan. 6, 1931. A. C. VAN HOOYDONK 1,788,214
MEAT CUTTING MACHINE
Filed July 26, 1928 2 Sheets-Sheet 2

Patented Jan. 6, 1931

1,788,214

UNITED STATES PATENT OFFICE

ADRIAN C. VAN HOOYDONK, OF BUFFALO, NEW YORK, ASSIGNOR TO JOHN E. SMITH'S SONS COMPANY, OF BUFFALO, NEW YORK, A CORPORATION OF NEW YORK

MEAT-CUTTING MACHINE

Application filed July 26, 1928. Serial No. 295,467.

This invention relates to a meat cutting machine of the type embodying a revolvable tiltable bowl and used by packers for cutting sausage meat.

Its chief object is the provision of simple and efficient means for effecting the tilting or elevation of the bowl for dumping its contents without handling the same.

Another object of the invention is to provide reliable and inexpensive fluid-operated means for raising and lowering the meat bowl without interfering with its drive mechanism.

In the accompanying drawings:—

Figure 1:
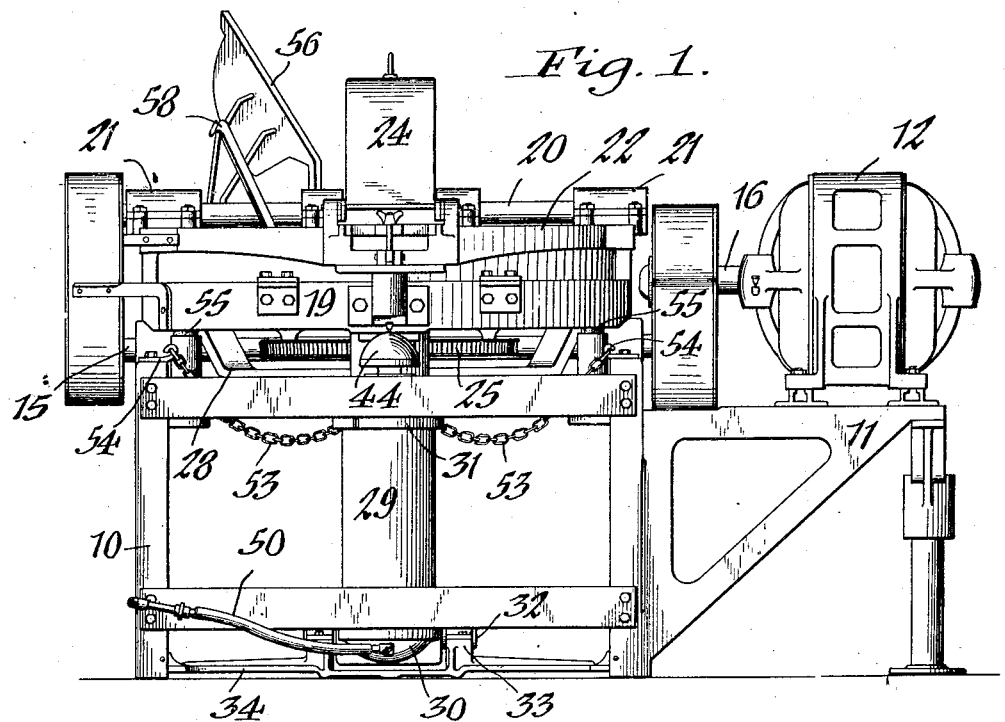
Figure 2:
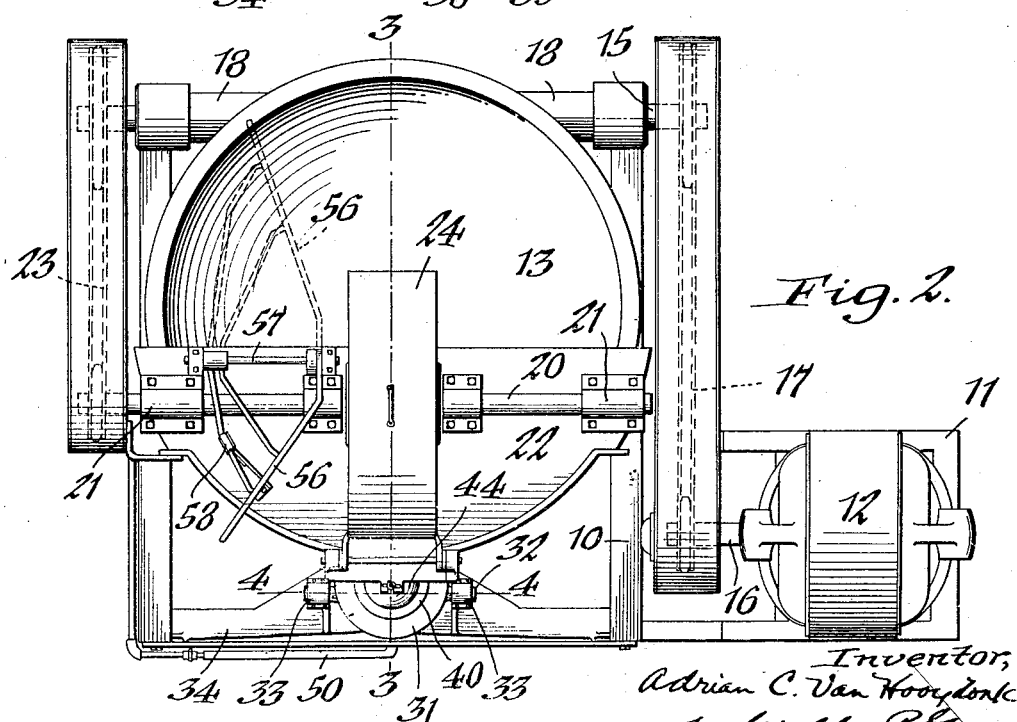

Figure 1 is a rear elevation of a meat cutting machine embodying my improvements and showing the bowl in its lowered position. Figure 2 is a top plan view. Figure 3 is an enlarged transverse section taken on line 3—3, Figure 2. Figure 4 is an enlarged fragmentary vertical section taken on line 4—4, Figure 2.

Similar characters of reference indicate corresponding parts throughout the several views.

The meat cutting machine shown in the drawings consists of a suitable supporting frame or table 10 on which its various working parts are mounted and having a bracket 11 at one side thereof to which an electric motor 12 is secured for transmitting motion to the meat bowl 13 and to the usual rotary cutter 14.

Journaled in suitable bearings at the front end of the machine is a horizontal driving shaft 15 connected to the motor-shaft 16 by a sprocket and chain drive 17, shown by dotted lines in Figure 2, or by equivalent means, and fulcrumed on this driving shaft by hinge brackets 18 loosely mounted thereon to rock relatively thereto is a tiltable support or bed-ring 19 in which the meat bowl 13 is revolvably mounted. The rotary cutter is mounted on a transverse shaft 20 journaled in bearings 21 carried by a cover-plate 22 arranged over the rear portion of the bowl and secured to the bed-ring in any appropriate manner. The cutter-shaft may be driven from the driving shaft 15 by a sprocket and chain drive 23, shown by dotted lines in Figure 2, and the cutter 14 is preferably enclosed by a hood or guard 24.

Any suitable means may be employed for rotating the bowl 13, that shown in the drawings being preferable and consisting of a worm-wheel 25 mounted on a vertical shaft 26 disposed axially below the bowl and attached to the underside thereof by bolts or other fastenings, the same meshing with a worm 27 mounted on the driving shaft 15 of the machine. The lower end of the worm-wheel shaft is journaled in a skeleton-like frame or spider 28 secured to the underside of the bed-ring 19.

The power-actuated means for raising and lowering the bed-ring and its bowl from the position shown by full lines in Figure 3 to the dotted line position shown in the same figure, and vice versa, is preferably composed of a plurality of telescopically-connected cylinders and pistons located in an upright position at the rear side of the machine and controlled by compressed air, one end of the hoist assembly being hinged to the supporting frame 10 of the machine and the other end being connected by a swivel-joint with the bed-ring. The numeral 29 indicates the outer or main cylinder of the hoist assembly which is provided at its lower end with a screw-threaded cap or closure 30 and at its upper end with a cap-ring 31, the lower cap having horizontal trunnions 32 at its diametrically opposite sides which are hinged or journaled in bearings 33 formed in a transverse base plate 34 secured at its ends to the lower rear side of the supporting frame 10. Operable in the cylinder is a plunger 35 having a central opening 36 and an attaching neck 37 rising therefrom to which the lower end of a second cylinder 38 is connected, the latter extending through a bushing applied to an internal annular flange 39 depending from the upper cap 31 into the corresponding end of the main cylinder 29. The upper end of the second cylinder 38 has a cap 40 fixed thereon, which, in the lowered position of the bowl, rests on the main cylinder-cap 31 and limits the downward movement of said second cylinder. Operable in the latter is a second plunger 41 of solid construction from which extends a tubular rod 42 passing at its upper end through the cap 40 and terminating in a ball 43 seated in a substantially spherical socket 44 formed in a bracket 45 secured to the rear side of the bed-ring 19. The ball-end of the plunger-rod 42 has a flange 46 thereon which is adapted to contact with a cushion seat or ring 47 applied to the top of the cap 40 for limiting the descent of the second plunger. The upward movement of the plungers 35, 41 is limited by the opposing lower edges of the caps 31, 40, respectively. While two operating cylinders and pistons have been shown in the drawings, it is to be understood that any number of them may be employed, depending on the size of the machine and the desired height required for dumping its contents.

The motive fluid, preferably compressed air, is admitted into the lower end of the main cylinder 29 from a chamber 48 formed in the lower cap 30 and opening directly into said cylinder, the wall of the chamber having an air inlet 49 to which the air line 50 is connected, the latter including a suitable valve, not shown, for controlling the admission and exhust of the air to and from the cylinder. The air inlet is restricted at its inner end, as indicated at 51, for the purpose of assuring a gradual admission of air to the cylinders 29, 38 to effect a corresponding movement of the bowl to its elevated position and likewise for retarding the movement of the bowl to its lowered position. The caps 31 and 40 are provided with suitable vents to insure proper working of the corresponding plungers 35, 41 in their cylinders.

In order to prevent the plungers 35, 41 completing their full upward or effective strokes and straining the various parts of the hoisting unit, flexible guy members or chains 53 are provided which are attached at their ends to eye-brackets 54 secured to opposite sides of the supporting frame 10 and to the bearing-spider 28 of the worm wheel shaft 26. Located at opposite sides of the supporting frame are cushioning elements 55 on which the bottom side of the bed-ring 19 is adapted to normally seat and which serve to cushion the return movement of the bowl as it approaches its horizontal position, preventing jarring and straining of the machine-parts.

As shown in Figure 2 a combined scraping and deflecting device is preferably employed for effecting the removal of the meat from the bowl 13 and directing the same into the receptacle provided for receiving it, when the bowl has been elevated to its dumping position. The device shown consists of a vertically-swinging blade or plow 56 adapted to extend transversely of the bottom and side walls of the trough-shaped bowl and conforming at its bottom edge to the curvature thereof. The blade is disposed at one side of the center of the bowl and is fixed at its inner end to a rock shaft 57 journaled in suitable bearings on the cover-plate 22. A hook 58 serves to hold the blade in its retracted or inoperative position.

In the operation of the machine, assuming the bowl 13 to be in its normal, lowered position and the same to have been filled with meat, the electric motor is started, thereby revolving the bowl and rotating the knives to cut the meat suitable for sausage or the like. When the cutting is completed, the scraper 56 is lowered to the position shown by dotted lines in Figure 2 and compressed air is admitted to the cylinder 18 to successively raise the plungers 35, 41 to elevate the bowl to the dotted line position shown in Figure 3 and dump its contents, the scraper effecting the complete removal of the meat as the bowl revolves. The valve controlling the air line is then turned to a position to exhaust the air from the cylinders, the restricted portion 51 of the port 49 permitting a slow descent of the bowl to its original position.

I claim as my invention:—

1. In a meat-cutting machine, the combination of a frame, a rotary bowl, a vertically-swinging support for said bowl hinged to said frame, and a pneumatically-actuated extensible device disposed between said frame, and the free end of the bowl-support for moving the latter to and supporting it in a tilted position.

2. In a meat-cutting machine, the combination of a frame, a rotary bowl, a vertically-swinging support for said bowl hinged at one side to said frame, a plurality of telescopic members interposed between the opposite side of said bowl-support and the frame, and means for actuating said telescopic members to move the bowl-support to a tilted position.

3. In a meat-cutting machine, the combination of a frame, a rotary bowl including a cutter, a driving shaft geared to said bowl, a support for the bowl hinged at one side to said driving shaft, and vertically-movable telescopic members interposed between the opposite side of said bowl-support and said frame.

4. In a meat-cutting machine, the combination of a frame, a rotary bowl, a vertically-swinging support for said bowl hinged to said frame, an extensible device for raising and lowering said bowl-support, and flexible guy members connecting the bowl-support with said frame for preventing the straining of said extensible device when said bowl-support reaches a predetermined raised position.

ADRIAN C. VAN HOOYDONK.